United States Patent [19]

Hopey

[11] Patent Number: 5,492,033
[45] Date of Patent: Feb. 20, 1996

[54] STEERING DAMPER IN AND FOR VEHICLES

[76] Inventor: Timothy C. Hopey, 4300 Rosanna Dr., Allison Park, Pa. 15101

[21] Appl. No.: 176,659

[22] Filed: Jan. 3, 1994

[51] Int. Cl.⁶ .................................................. B62K 21/12
[52] U.S. Cl. .................. 74/551.1; 280/272; 280/276; 280/279; 74/551.2
[58] Field of Search .................. 74/551.1–551.8; 280/272, 276, 279

[56] References Cited

U.S. PATENT DOCUMENTS

| | | | |
|---|---|---|---|
| 5,285,697 | 2/1994 | Clausen | 280/276 X |
| 5,305,654 | 4/1994 | Durham | 280/279 X |
| 5,359,910 | 11/1994 | Chang et al. | 74/551.1 X |

FOREIGN PATENT DOCUMENTS

| | | | |
|---|---|---|---|
| 134671 | 4/1933 | Austria | 280/272 |
| 538639 | 6/1922 | France | 280/272 |
| 5-105172 | 4/1993 | Japan | 280/276 |
| 717259 | 10/1954 | United Kingdom | 280/276 |

*Primary Examiner*—Vinh T. Luong
*Attorney, Agent, or Firm*—Hymen Diamond

[57] ABSTRACT

A steering damper for mountain bicycles including a closed cylinder filled with oil of high viscosity including a dam and vanes rotatable from center towards and away from the dam. The vanes are connected rotatably with the handlebars in reciprocal steering relationship with a steerable wheel. When the steerable wheel encounters an obstruction displacing it from center, the vanes are driven in the oil one towards and one away from the dam respectively decreasing and compressing and increasing and relaxing the corresponding volumes of the oil and damping the movement of the handlebars. The damping against the return of the handlebars and steerable wheel to center is suppressed by one-way valves in the vanes which open when the compressing vane is retracted, recesses in the cylinder providing a non-resistant path for the oil moving through the valve in the retracting vane.

24 Claims, 6 Drawing Sheets

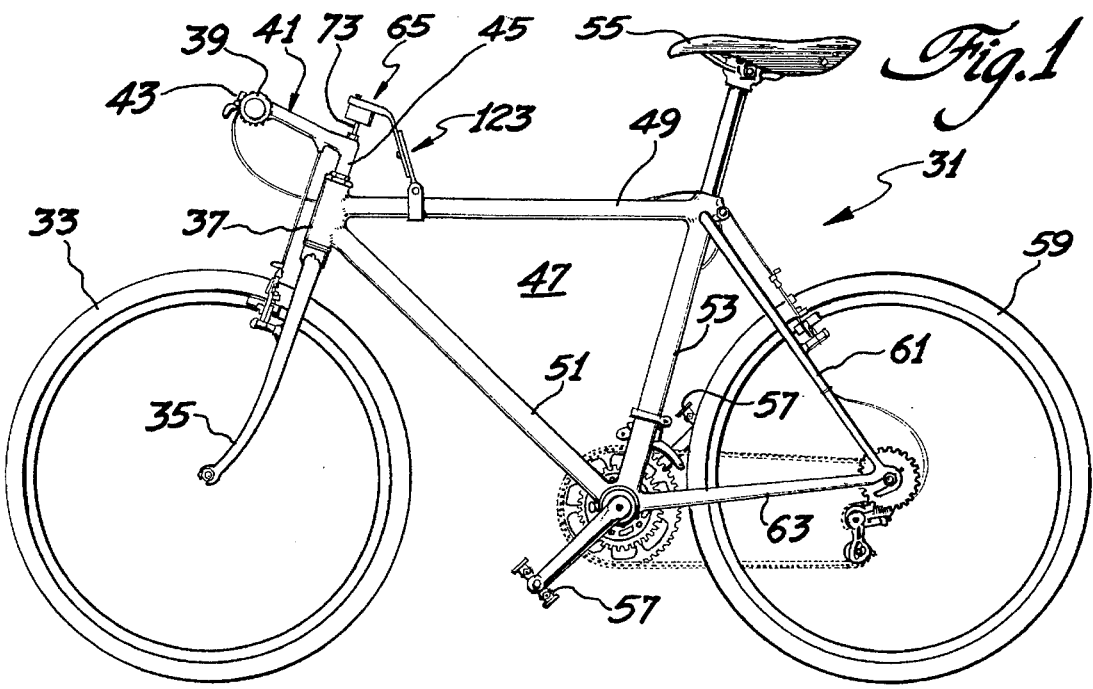
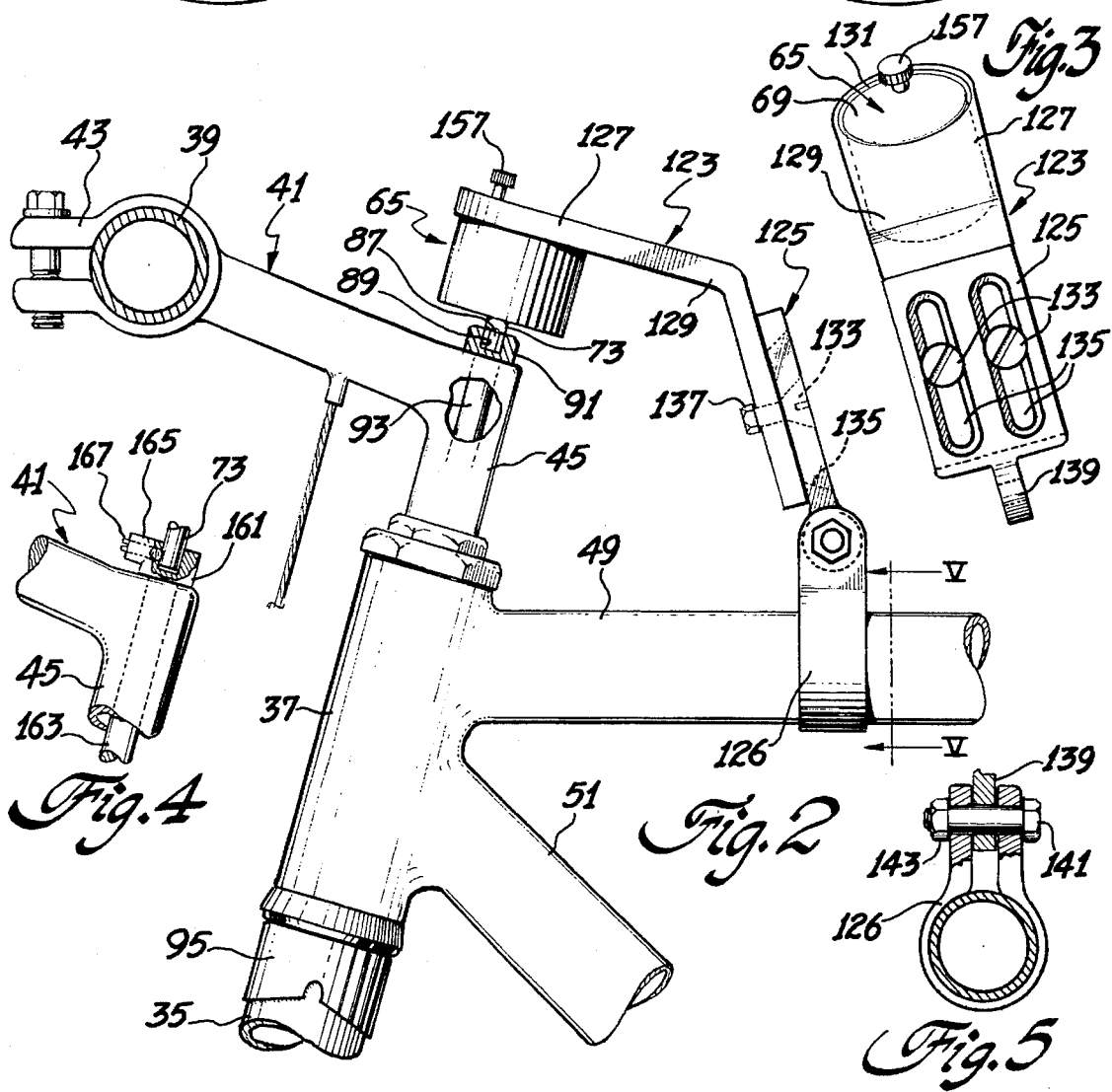

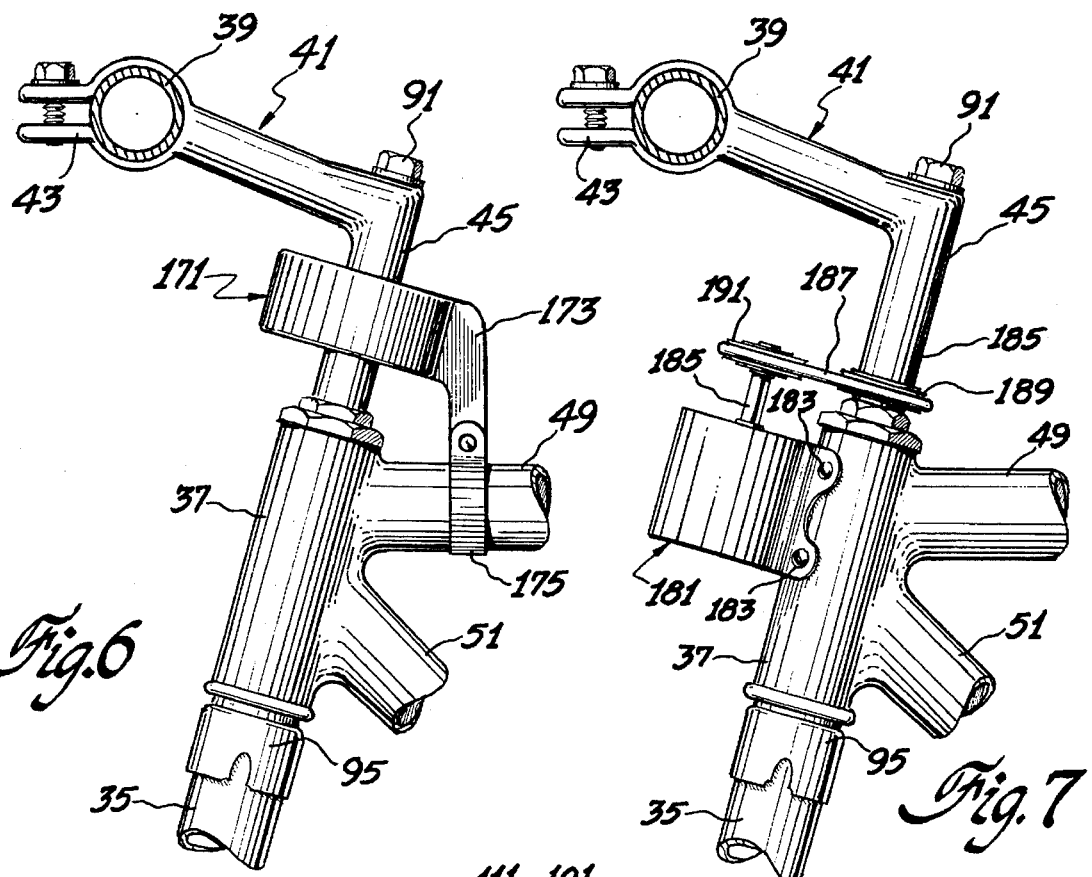
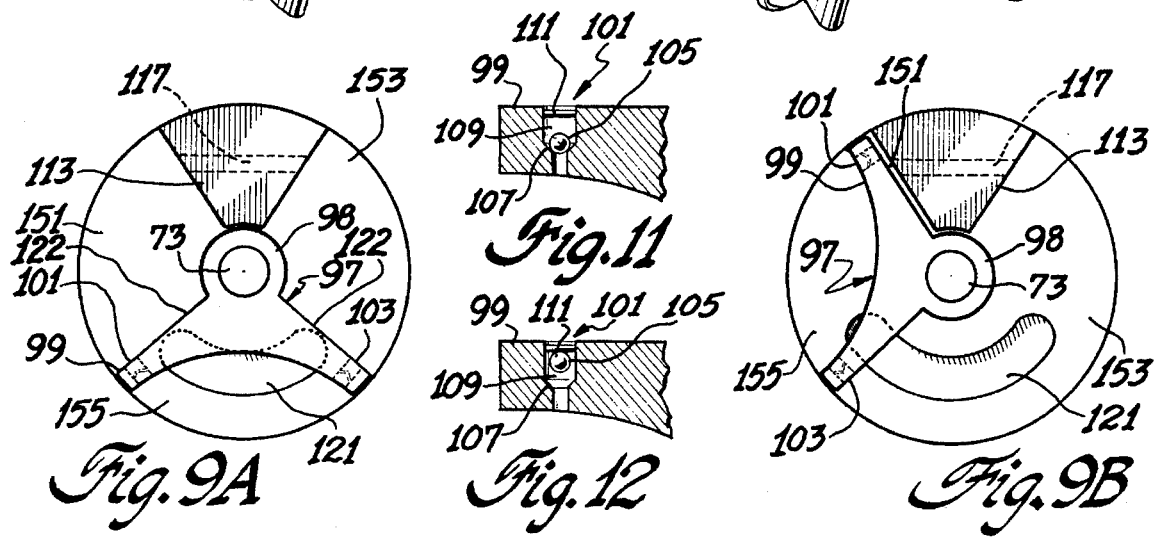
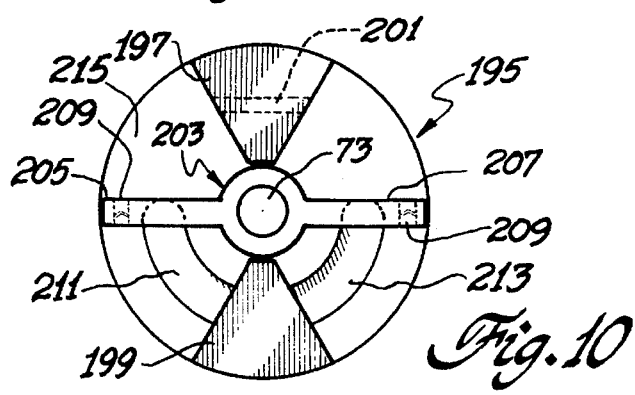

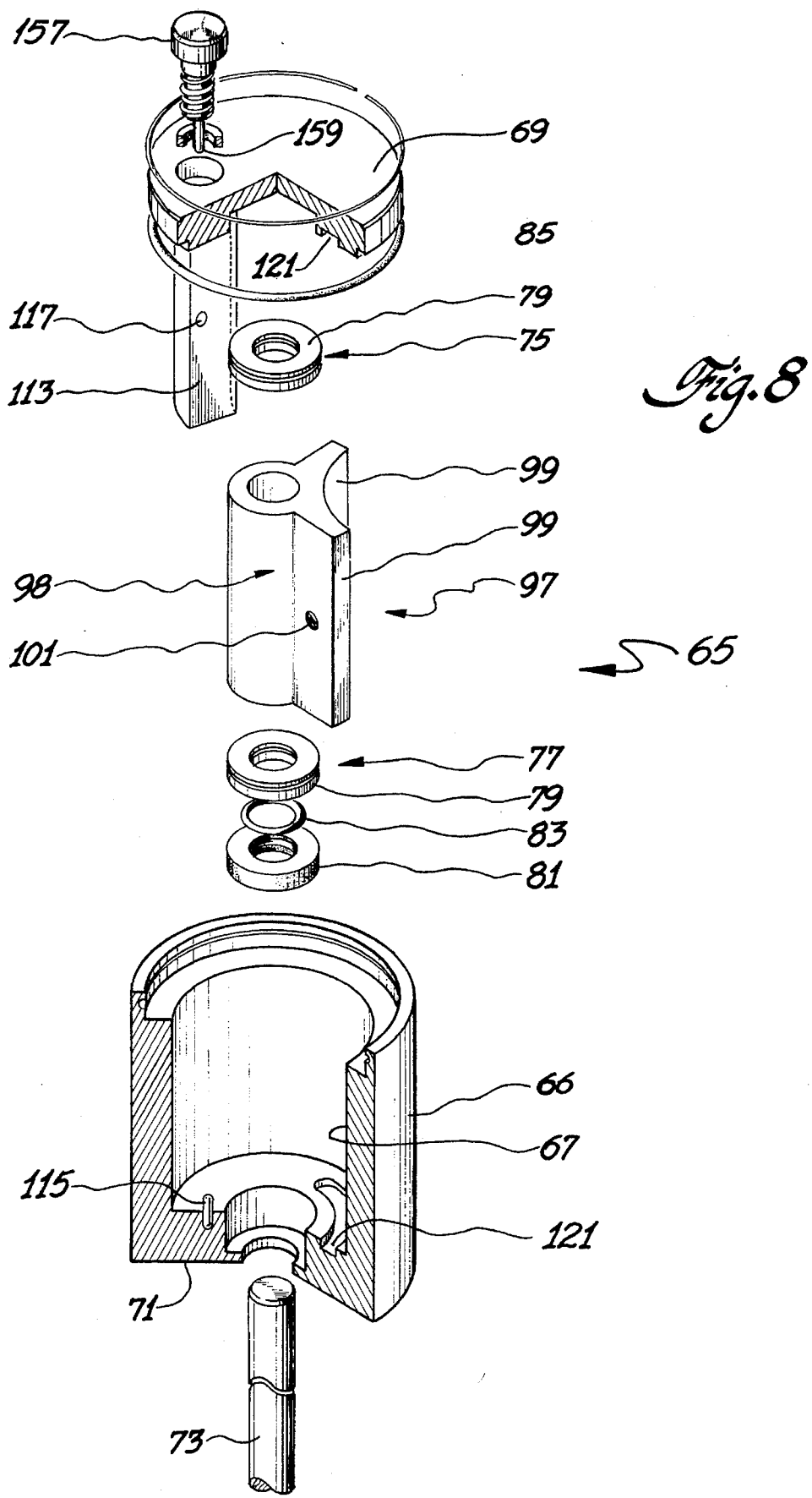

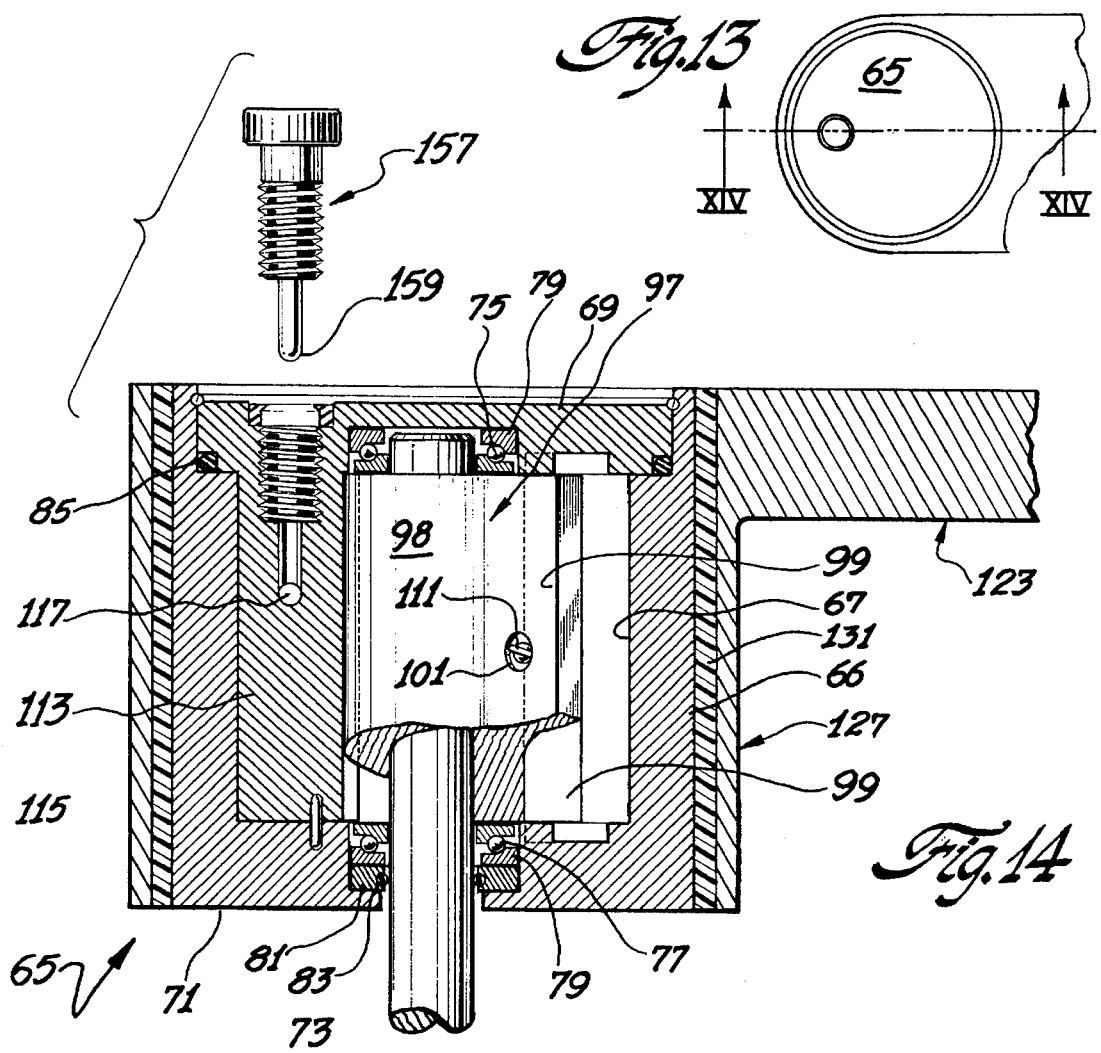
Fig.13
Fig.14
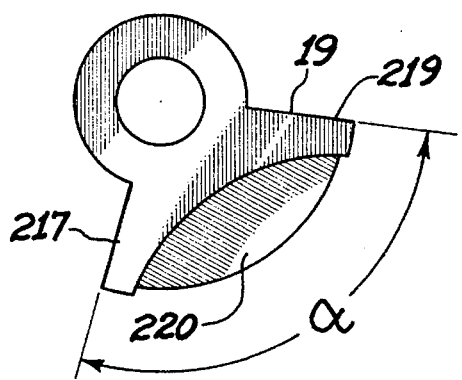
Fig.16
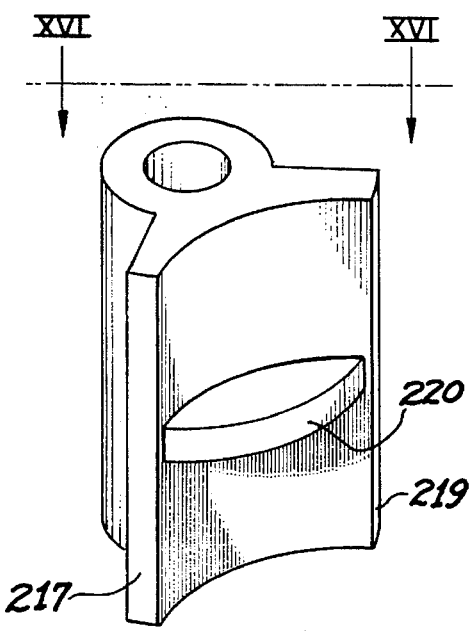
Fig.15

STEERING DAMPER IN AND FOR VEHICLES

BACKGROUND OF THE INVENTION

1. Field of the Invention

This invention relates to vehicles and it has particular relationship to bicycles with emphasis on mountain bicycles. It is to be understood that, to the extent that the principles of this invention are adapted to other vehicles than bicycles, for example, motorcycles, or even automobiles or trailer couplings, such adaptation is to be regarded as within the scope of equivalents of this invention.

2. Description of the Prior Art

A mountain bicycle is driven over unpaved trails in parks and over hills and mountains. Such trails have obstructions such as rocks and exposed roots of trees. When the steerable wheel of a bicycle, in accordance with the prior art, encounters such an obstruction, it turns or pivots in one direction or the other, causing the bicycle suddenly to head in this direction and turns the handlebars contrary to the guiding force exerted by the rider with the possibility that the bicycle may leave the trail and injure the driver.

It has been realized that to deal with this problem, it is necessary to stabilize or damp the steering movement of the handlebars. Prior art which deals with stabilizing the movement of the handlebars is typified by Motrenec, U.S. Pat. No. 4,736,962, and Gustafsson, U.S. Pat. No. 4,773,514. These patents deal with motorcycles, specifically dirt motorcycles. They do not deal with the problems to which this application is directed. Motrenec does not describe what purpose its steering stabilizer serves and Gustafsson is concerned with wobbling of the front wheel and shock absorption of the back wheel when jumping.

As a bicycle is driven linearly, the driver rocks back and forth laterally in pedalling. This rocking movement has a tendency to turn the steerable wheel and handlebars back and forth laterally, dissipating the energy from the driver particularly when the driver has driven up a grade.

It is an object of this invention to overcome the above-described deficiencies of the prior art and to provide a bicycle which shall not present in use the above-described hazard of leaving a trail, or in case of an ordinary bicycle, a road, on contacting an object in the trail or road in its path.

It is another object of this invention to provide a bicycle in whose operation the dissipation of the energy of the driver by the rocking movement along a linear path shall be materially reduced.

SUMMARY OF THE INVENTION

In arriving at this invention, it was realized that, to prevent a bicycle from leaving a trail when its front wheel contacts an object, prompt and effective counteraction or remedial action is indispensable. The handlebar control of the bicycle must lend itself to immediate resetting of the handlebars to a setting which will enable the driver to prevent it from leaving the trail and also suppresses the reaction of the bicyle as a whole to the return to center. The steering stabilizing of Gustafsson and Motrenec reduces the rate at which the steerable wheel and the handlebars are displaced or deflected, but they also resist return of the steerable wheel and the handlebars to center by the driver.

In accordance with this invention, steering damping is provided for or integrated into a bicycle to facilitate the steering and enhance the stability of the bicycle. This steering damping is effective as the bicycle handlebars actuated by the steerable wheel are turned away from straight-line riding or "center," i.e., as in turning the bicycle either right or left, but offers negligible or no damping effect when returning the bicycle handlebars and the steerable wheel back toward straight-line riding or "center." The steering damping may or may not be speed sensitive or displacement sensitive and may or may not be internally or externally adjustable. The steering damping is to be actuated from the axis at the centerline of the bicycle steering stem by either incorporating damper into the bicycle steering stem, thus allowing steering damper to rotate around centerline of steering stem and/or mounting said steering damper elsewhere on the bicycle and actuate steering damper from steering stem centerline via linkage, gears, rack/pinion, drive-belt, etc.

Specifically, the steering damping is in accordance with this invention, effected by a steering damper including a container filled with oil and having closures at the ends thereof. Within the container, there is a fixed dam and a vane assembly including vanes extending from a shaft. The vanes at their ends extend axially to the closures and radially to the wall of the container between the closures. The steering damper is mounted on or integrated with a vehicle which has handlebars which are rotatable or pivotal about an axis and are connected to a steerable wheel. The handlebars are rotatable or pivotal in synchronism with the steerable wheel either to steer the wheel or by the wheel when the wheel contacts an obstruction over which the vehicle is moving. The steering damper is mounted on or integrated with the vehicle with its shaft of the vane assembly coaxial with or connected to the axis about which the handlebars rotate, rotatable in synchronism with the rotation of the handlebars and the steering rotation of the steerable wheel. The steerable wheel, the handlebars and the shaft are rotatable together in either direction from a center. When the vehicle is driven along a straight path, the steerable wheel, the handlebars and the vanes are all at center. When the steerable wheel and the handlebars are rotated, the vanes are displaced in a corresponding direction by a corresponding magnitude. One vane, depending on the direction of rotation, is displaced towards the dam defining with the dam a compartment of decreasing volume and compressing the oil between the one vane and the dam and the other vane is displaced away from the dam, defining with the dam a compartment of the increasing volume and relaxing the pressure on the oil in the latter compartment. There is a passage at the dam for the passage of oil from the compartment decreasing in volume to the compartment increasing in volume. This passage may be a hole through the body of the dam, or between the dam and the wall of the container or any structure. The effect of this operation is to damp the movement of the handlebars and reduce the rate of movement of the handlebars and steering wheel. Abrupt rapid departure from its driven path is thus precluded.

The damping which would resist or delay the return to center of the steerable wheel and handlebars is suppressed. To achieve this purpose, the vanes are provided with one-way valves. The valve in the vane approaching the dam is closed as the vane approaches the dam, but opens when this vane is displaced in the opposite direction, permitting the oil to flow from the third compartment defined between the vanes and relaxing the damping pressure on this now retreating vane. In addition, one or both closures is or are provided with a recess or recesses through which the oil being advanced by the vanes in each compartment may flow freely until the vanes are returned to center.

BRIEF DESCRIPTION OF THE DRAWINGS

For a better understanding of this invention, both as to its organization and to its method of operation, together with additional objects and advantages thereof, reference is made to the following description taken in connection with the accompanying drawings, in which:

FIG. 1 is a side view in elevation of an embodiment of this invention, showing a bicycle provided with a steering damper in accordance with this invention;

FIG. 2 is a fragmental, enlarged view, also in elevation, showing a portion of the bicycle with the steering damper mounted thereon;

FIG. 3 is a view in elevation, showing a mounting bracket for the steering damper of FIG. 1;

FIG. 4 is a fragmental view, partly in section showing an alternative connection of the shaft of the steering damper which drives the vanes for movement in synchronism with the movable components of the bicycle;

FIG. 5 is a view in transverse section taken along direction V—V of FIG. 2;

FIGS. 6 and 7 are fragmental views showing modifications of the mounting of the steering damper on the bicycle of FIG. 1, FIG. 8 is an exploded view in isometric, showing the steering damper assembly of the bicycle shown in FIGS. 1, 7, 2;

FIG. 9A is a plan view partly diagrammatic showing the inside of the container of the steering damper with the vane assembly at center;

FIG. 9B is a plan view similar to FIG. 9A but with the vane assembly displaced corresponding to the displacement of the steerable wheel and handlebars in one direction;

FIG. 10 is a plan view similar to FIG. 9A but showing a modification of this invention;

FIG. 11 is a diagrammatic view showing a one-way valve in its closed setting in the left hand vane (FIG. 9B) when the steerable wheel and handlebars are being displaced away from center;

FIG. 12 is a diagrammatic view showing a one-way valve in its open setting in the left hand vane when the steering wheel and handlebars are being reset to center;

FIG. 13 is a fragmental plan view of the steering damper in accordance with this invention as mounted on the bicycle;

FIG. 14 is a view in transverse section partly exploded, taken in the direction XIV—XIV of FIG. 13;

FIG. 15 is a view in isometric showing a modified vane assembly;

FIG. 16 is a plan view of the vane assembly shown in FIG. 15, taken in the direction XVI—XVI of FIG. 15;

DETAILED DESCRIPTION OF EMBODIMENTS

Figure 24:
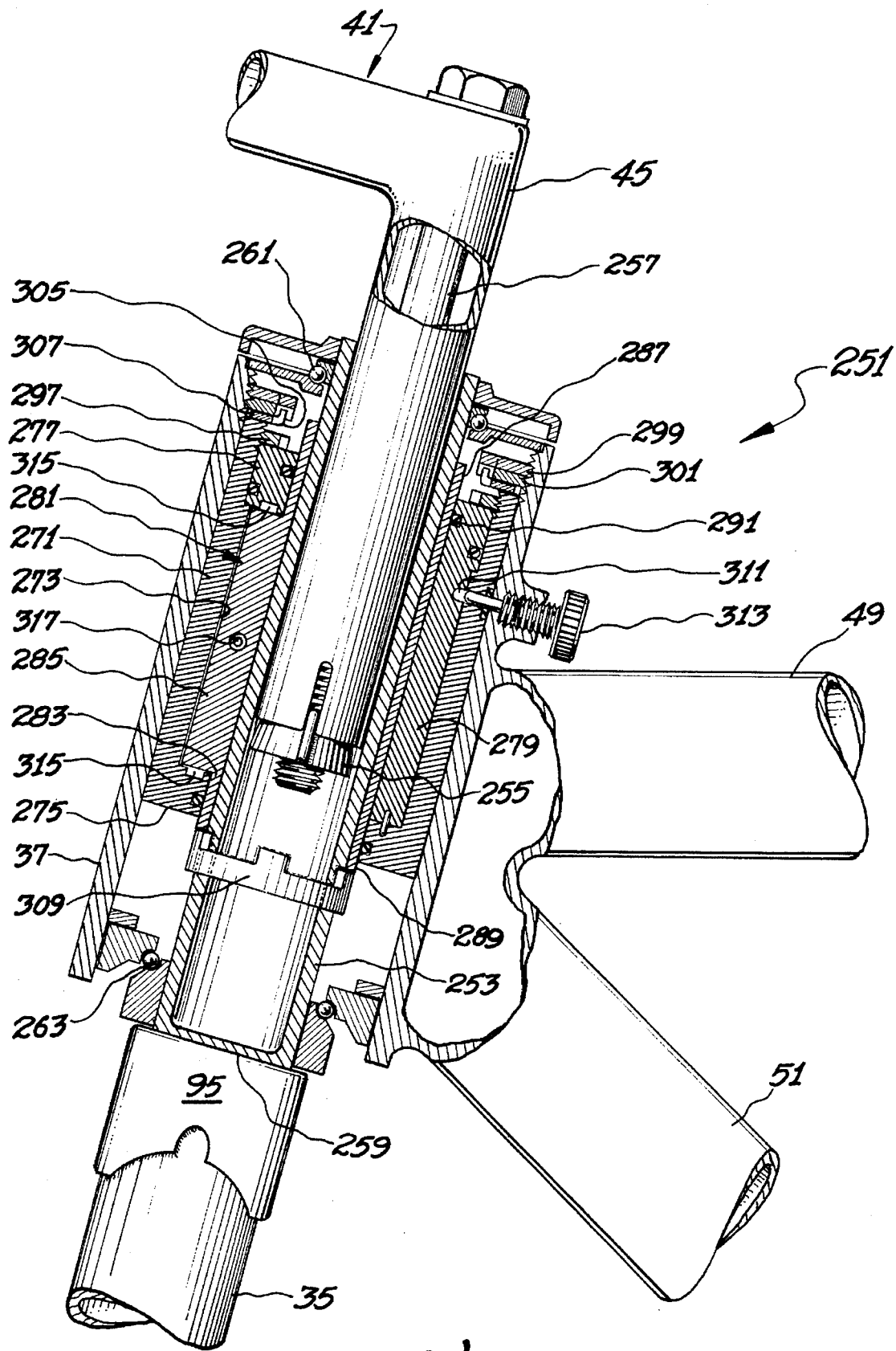
FIG. 24 is a view partly in longitudinal section of a modification of this invention in which the steering damper is integrated into the bicycle head.

The apparatus shown in the drawings is a bicycle 31 (FIGS. 1, 2) having a steerable wheel 33 axially supported on a fork 35 connected in a head 37 to handlebars 39, secured at the outer end of a gooseneck 41 by clamp 43 (FIG. 2). The arm 45 of the gooseneck 41, remote from the handlebars 39, is connected to the fork 35 within the gooseneck so that the fork 35 is rotatable with the handlebars 39 in turn rotating the steerable wheel to steer the bicycle. Conversely, on steering rotation of the steerable wheel 33, the handlebars are rotated correspondingly. In either case, the steerable wheel 33 and the handlebars 39 may be said to rotate or pivot back and forth in synchronism with each other. This connection between the gooseneck 41 and the fork 35, which produces the synchronous rotation of the handlebars and steerable wheels, is shown in FIG. 24.

The head 37, the gooseneck 41 and the handlebars 39 and the fork 35 are supported by a triangular frame 47 including top tube 49, down tube 51 and seat tube 53. The head 37 is structured with the top tube 49 and down tube 51 integrally at the ends of the tubes. The seat 55 is supported by the seat tube and the pedals 57 are rotatable supported from the apex formed between the down tube 51 and the seat tube 53. The rear wheel 59 is rotatably supported at the junction of seat stay 61 and chain stay 63.

What has been described here is predominantly a typical conventional mountain bicycle 31. This description is necessary for the understanding as to how a steering damper 65 (FIGS. 1, 2), according to this invention, is integrated with the bicycle 31.

This steering damper 65 includes a cylindrical container 66 having a cylindrical wall 67 and closures 69 and 71 (FIGS. 8, 14) at the ends. A shaft 73 extends centrally from the top closure 69 through the bottom closure 71. The shaft 73 is rotatable on ball bearings 75 and 77 whose fixed bearing rings 79 are seated in the closures 69 and 71. The lower fixed ring 79 is seated on a washer seal 81 having an O-ring 83 that seals the opening through which the shaft 73 passes. The top closure 69 has an O-ring seal 85 at the junction between the wall 67 and the top closure 69. At its lower, protruding end, the shaft 73 carries a hexagonal tip 87 (FIG. 2) which engages a hexagonal seat 89 in the head 91 of a bolt 93, which is connected through the fork head 95 (FIG. 2) to connect the fork head 95 and the fork 35 to rotate in synchronism with the gooseneck 41 and the handlebars 39.

The shaft 73 carries a vane assembly 97 having a hub 98 from which vanes 99 extend radially integrally therewith (FIG. 14). The shaft 73 and the vane assembly 97 can be an integral structure. The vanes are of generally rectangular shape and are joined by an arcuate member extending integrally from the hub 98 (FIG. 8). The vanes 99 are rotated with the shaft 73. Through the bolt 93 (FIG. 2), the vanes 99, steerable wheel 33, gooseneck 41 and handlebars 39 are rotated in synchronism. Each vane 99 has a one-way valve 101 and 103 near the outer end thereof (FIGS. 9A, 9B). Each valve has a ball 105 which engages a seat 107 at the entrance to a restricted portion of a passage 109 through a vane 99. Across the end of the expanded portion of the passage, there is a pin 111 which prevents the ball 105 from being ejected from the passage. Valves of other types than the ball valves, for example, flapper valves, may be used.

A dam 113 in the form of a block having the shape of a sector extends integrally from the upper closure 69. The dam 113 is a slide-fit into the cylindrical container 66. The dam is held positioned by a pin 115.

The vanes 99 are at an angle such as to maximize the rotation travel of the vanes from center to either side of the dam 113. Typically, the dam may subtend an angle of about 60°. In this case, the vanes divide the enclosure into three generally equal compartments at an angle of approximately 100°.

There is a hole 117 transversely through the dam. Along a portion of each closure, there is a recess 121. The recess may be along both closures as shown, or only along one closure. It may have any reasonable shape. As shown (FIG. 9A), the recess 121 extends between the edges 122 of the vanes 99 on the side of the dam when the vane assembly 97 is at center.

The function of the recess 121 and its length can be understood by reference to FIG. 9B as the vanes 99 are returning to center. During this operation, the valve 101 is open and valve 103 is closed. Oil relieving the opposing pressure against return of the handlebars to center can flow through valve 101. But valve 103 being closed, there must be another avenue for relieving the pressure. This is recess 121. To maximize the sweep of the vanes 99, the vanes may be of small width in the region where they pass over recess 121. The valves 101 and 103 and the recess 121 constitute means for suppressing the damping on the return of the handlebars.

The cylindrical container 66 is filled with oil. A more viscous or heavier oil is desirable. Typically, Dow Corning Silicone Hydraulic Fluid 10,000 centistokes is used. The dam 113 extends along the whole length of the cylindrical container 66 and along the inner surface 67 of the closure cylinder 66 in sliding contact therewith. Instead of passing through the hole 117 when under pressure by vane 99, the oil may pass through the space between the dam 113 and the wall 67 of the cylinder or between the dam and the hub 98 or through any other channel. The hole 117 and the other alternatives mentioned here for the transmission of the oil under pressure constitutes means responsive to the pressure or increasing pressure or exerted pressure for transmitting oil which may also be described as "fluid" from the compartment 151 to compartment 153 or, if the handlebars are turned in the opposite direction from compartment 153, to compartment 151. The vanes 99 extend axially along the whole length of the cylindrical container 66 near, but out of physical contact with, the closures and radially near, but out of contact with, the cylindrical surface 67 except along the recesses 121. The spacing should be such that the vanes are freely movable, but such that no substantial quantity of oil flows between the vanes and the closures or surface 67.

The steering damper 65 is supported between the head 91 of the bolt 93 and the top tube 49 of the frame 47, i.e., essentially between the gooseneck 41 and the frame 47, by brackets 123, pivotal slotted plate 125 and clamp 126 (FIGS. 2, 3, 5). The bracket 123 includes a yoke 127 from which an angular plate 129 extends. The yoke 127 encircles the top of the steering damper 65. A lubricant medium such as a nylon sleeve 131 is interposed between the yoke 127 and the outer cylindrical wall 67 (FIG. 14). The sleeve 131 permits the cylindrical container to move in the event that the vane assembly 97 or shaft 73 has been frozen in any position and cannot be rotated.

The angular arm 129 is secured to the slotted plate 125 by bolts 133 which are passed through the slots 135 in the slotted plate and through the plate 129 and are secured by nuts 137 on the remote side of plate 129. The slots permit adjustment of the positioning. An eyelet 139 extends from the remote end of the slotted plate and is secured between the ends of the clamp 126 by a bolt 141 and nut 143 (FIG. 5). The assembly of the brackets 123 and slotted plate can be angularly adjusted.

In the operation of the bicycle 31, the vane assembly 97 of the steering damper 65 is in the position shown in FIG. 9A with the bicycle moving along a straight path. The vanes 99 are remote from the dam 113. The balls 105 of the valves 101 and 103 are in an intermediate position. It is now assumed that the handlebars are turned or the wheel 33 is turned by contact with a rock or a root in a direction such that the vane assembly 97 is rotated clockwise. The vane 99 (FIG. 9A) on the left sweeps towards the dam contacting the dam 113, as shown in FIG. 9B, for a sharp turn. Between vane 99 on the left and the dam 113, a first compartment 151 of decreasing volume is defined and between the vane 99 on the right and the dam 113, a second compartment 253 of increasing volume is defined. The dam 113 may be described as means in the container 66 to define with the vane 99 as first compartment 151. There is also a third compartment 155 of substantially constant volume which moves clockwise. The motion of the fluid relative to the vane 99 on the left is counterclockwise. Its valve 101 is closed as shown in FIG. 11. The fluid is compressed and flows through hole 117 in the dam. The movement of the handlebars 39 and of the steerable wheel 33 are damped to an extent depending on the flow-through hole 117 or any other passage. The flow may be controlled by the setting of screw 157 whose tapered tip 159 penetrates into hole 117, depending on the setting of the screw (FIG. 14). During the above-described movement of the vane assembly 97, the relative flow of the fluid is such as to open valve 103, but this has no effect on the operation.

The rider counteracts the turning movement of the bicycle by turning the handlebars 39 so that the left-hand vane 99 rotates counterclockwise. The motion of the fluid relative to this vane is now clockwise opening valve 101 as shown in FIG. 12, so that the pressure opposing the counterclockwise motion of the left-hand vane is reduced and the damping on the handlebars 39, the steerable wheel and gooseneck are reduced. Pressure and damping on the right-hand vane is reduced by the flow of the fluid into and through the recesses 121. The rider is thus enabled, readily, to stabilize the undesirable motion of the bicycle and to avoid a serious accident.

In the practice of this invention, the energy dissipated in the rocking movement of the bicycle, particularly as the bicycle is pedalled up hill, is reduced by the damping as the handlebars are turned and by the suppression of the damping as the handlebars are returned to center. This feature is unique to bicycles in accordance with this invention.

In accordance with a modification of this invention, the hexagonal joint 87–89 (FIG. 2) for securing the shaft 73 to the bolt 93 may be replaced by the mechanism as shown in FIG. 4. The head 161 of bolt 163 through which the fork 35 is driven with the handlebars 39 has a projection 165 through which a set screw 167 secures the shaft 73.

FIG. 6 shows another modification of this invention. The steering damper is mounted coaxially on the arm 45 of the gooseneck. The mounting includes the yoke 171 whose arm 173 is pivotally connected to clamp 175 which engages top tube 49. The vane assembly 97 is connected directly to the arm 45 of the gooseneck 41. The vane assembly 97 is not shown in FIG. 6, but it will be understood that the arm 45 is secured to the hub 98 to rotate the vane assembly in the same way that shaft 73 rotates the vane assembly when driven through bolt 93 (FIG. 2) in synchronism with the handlebars 39.

FIG. 7 shows another modification. The steering damper 181 is provided with feet 183 by which it is suspended from the head 37. The vane assembly 97 (not shown in FIG. 7) is driven through shaft 185, which is rotated in synchronism with the gooseneck 41 by belt 187. The belt 187 is driven by a pulley wheel 189 which is mounted rotatably with the arm 45 of the gooseneck 41 and drives pulley wheel 191. Internally, the steering damper 181 is the same as steering damper 65.

FIG. 10 shows a steering damper 195 having diametrically disposed dams 197 and 199. Only dam 197 has a hole 201. But both dams could have a hole. The vane assembly 203 has diametrically opposite vanes 205 and 207, each having a valve 209. Recesses 211 and 213 extend from each side of the dam 199. The steering damper 195 is shown in the center position when the bicycle is moving linearly. The recesses 211 and 213 extend from the edge of each vane facing the dam 197 in the center position.

When the bicycle turns or is turned in such a direction as to rotate vane assembly 203 clockwise, vane 205 moves towards dam 197 compressing the fluid in chamber 215 and forcing fluid through hole 201, damping the movement. For the return movement, the vane assembly rotates counterclockwise, opening valve 209 and discharging oil into recess 213, substantially suppressing the damping against return to center.

FIGS. 15 and 16 show a vane assembly 216 whose vanes 217 and 219 are joined by a bridge 220 which functions as a structural support.

Figure 17:
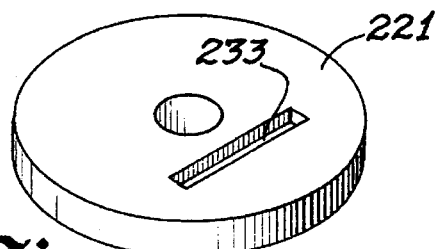
FIGS. 17 through 22 are each a view in isometric showing different recesses in the closure of the container of the steering damper.
Figure 21:
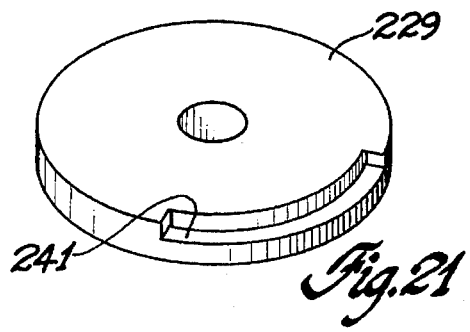
Figure 18:
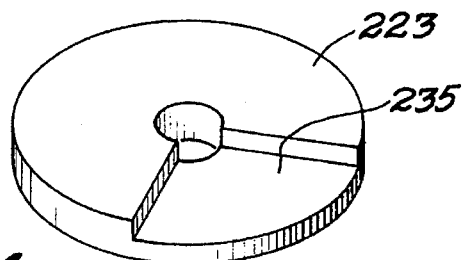
Figure 22:
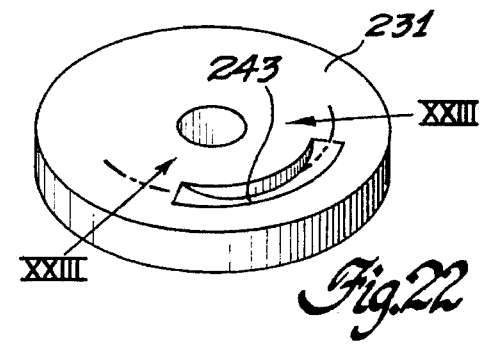
Figure 19:
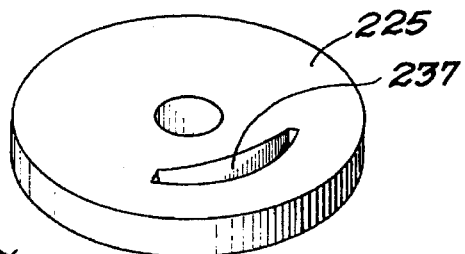
Figure 23:
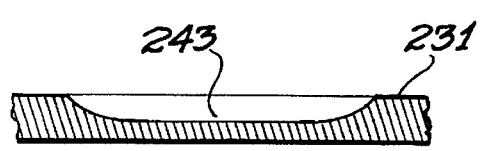
FIG. 23 is a view in section taken in the direction XXIII—XXIII of FIG. 22.
Figure 20:
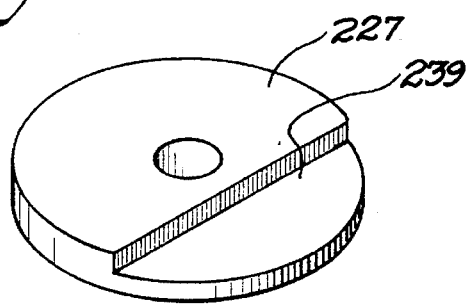

FIGS. 17 through 22 show closures 221, 223, 225, 227, 229, 231 for a steering damper with recesses 233, 235, 237, 239, 241, 243, respectively, of different shape. FIG. 23 is a view in longitudinal section in direction XXIII—XXIII of FIG. 22.

FIG. 24 shows in longitudinal section except for parts along the axis a steering damper 251 integrated into the head 37 of a bicycle. Within the head 37, there is a steering stem 253. The arm 45 of the gooseneck 41 is encircled by the steering stem 253 and secured thereto by a tapered nut 255 which is drawn into the end of arm 45 by turning bolt 257. The steering stem is secured by its base 259 to the fork head or fork cross member 95 which is in turn secured to the fork blades 35. The arm 45, steering stem 253, bolt 257, nut 255, fork head 95 and fork blades 35 constitute a rigid assembly which is rotatable on ball bearings 261 and 263 at the upper and lower ends.

The steering damper 251 includes a closed cylinder container 271 having a cylindrical wall 273. The base or lower closure 275 is integral with the wall 273. At the top the cylinder is closed by a cross member 277 with which the dam 279 is integral. There is a vane assembly 281 including a hub 283 and vanes 285. The hub 283 has cylindrical extensions 287 and 289 at both ends. The extension 287 at one end passes through an opening in the cross member 277 and the extension 289 at the opposite end passes through the base 275. The joint between extension 287 and the member 277 is sealed by O-ring 291. The joint between the cross member 277 and the wall 271 is sealed by O-ring 293. The joint between the base 275 and the extension 289 is sealed by O-ring 295. The dam assembly including the cross member 277 and the dam 279 is secured by nut 297, which is screwed into a thread along the end of an extension of wall 273. Lock nuts 299 and 301 are screwed into a thread 303 near the end of the wall of the head 37. The lock nut 301 is engaged by interlocking projection 305 from washer 307. The dam 279 is positioned to the base 275 by a pin. The steering stem 253 is connected to the vane assembly 281 by key ring 309, which is secured to the steering stem and is keyed to extension 289. The vane assembly is rotatable with the steering stem 253 and through it with gooseneck 41 and handlebars 39. The sealed region in container 271, which contains the vane assembly 281 and the dam 279, is filled with oil.

The dam 279 has a groove 311 in its periphery for passing the oil as it is compressed by a vane 285. The opening size may be varied by screw 313. The base 275 and the cross member 277 have recesses 315. The vane 285 has a one-way valve 317. The steering damper 251 operates in the manner described above with respect to the steering damper 65 shown in FIGS. 1 and 2 and is similar in internal structure to damper shown in FIG. 6.

While preferred embodiments of this invention are disclosed herein, it is understood that many modifications thereof are feasible. While the practice of this invention with a plurality, usually two, vanes is to be preferred, this invention may also be practiced with one vane which would sweep in either direction from center in synchronism with the handlebars, compressing the fluid in one chamber defined between the vane and a dam and relaxing the fluid in the other chamber defined between it and the dam. This invention is not to be restricted except insofar as is necessitated by the spirit of the prior art.

I claim:

1. A vehicle including a frame, steerable wheel means movably mounted on said frame, handlebars mounted on said frame rotatable about an axis relative to said frame and connected to said steerable wheel means, for controlling the steering movement thereof, and a steering damper connected to said handlebars for damping the movement of said handlebars on the contact of said wheel means with an obstruction undesirably turning said wheel means and the handlebars connected thereto; said damper including: a hollow cylinder having closures at the ends thereof, said cylinder and closures forming a cylindrical assembly, means connecting said assembly fixedly to said frame, said assembly being adapted to have therein a damping fluid, a dam fixedly connected to said assembly extending into said cylinder along the lenth of said cylinder, vanes mounted on said assembly, said vanes being dimensioned to extend axially between said closures and radially to the inner periphery of said cylinder, means, penetrating through said closure at least at one end of said assembly, connecting said handlebars to said vanes so that said vanes are rotatable in synchronism with the rotation of said handlebars about said axis in said fluid, said rotation of said vanes defining closed compartments of variable volume between said dam and each vane with the one compartment defined by one said each vane approaching the dam with said handlebars moved in one direction decreasing in volume and the other compartment defined by the dam and the other of said each vane retreating from the dam increasing in volume, said approaching vane producing pressure towards the dam in the fluid in said one compartment, means, responsive to said pressure, for transmitting the fluid under said pressure from said one compartment to said other compartment, said transmitting means being adapted to enable said fluid as it is transmitted to damp the movement of said handlebars in said one direction, and means, responsive to the return of said handlebars in the direction opposite to said one direction, for permitting the return of said handlebars in the direction opposite to said one direction with substantially no damping.

2. The vehicle of claim 1 wherein the handlebar-permitting-return means includes a one-way valve in each vane means structured to open to pass the fluid when said each vane is retreating from the dam and to close when said each vane is approaching the dam.

3. The vehicle of claim 2 wherein the handlebar-permitting-return means also includes at-least-one recess in the closure over which the retreating vane defining the other compartment sweeps on the return of the handlebars providing a leak path for the fluid contacted by said retreating vane, said recess extending substantially throughout the sweep of the retreating vane for the complete return of the handlebars.

4. The vehicle of claim 3 wherein the at-least-one recess extends substantially through the length of the sweep of the retreating vane.

5. The vehicle of claim 3 wherein the at-least-one recess is a slot in the closure over which the retreating vane sweeps.

6. The vehicle of claim 1 wherein the dam is supported in the assembly from one of the closures and is a slip-fit against the cylindrical wall.

7. The vehicle of claim 1 wherein the vanes are at an angle such as to maximize the rotational travel of the vanes as said vanes sweep back and forth between center and the dams.

8. The vehicle of claim 1 wherein the vanes are at an angle substantially of 180°.

9. The steering damper of claim 1 wherein the pressure opposing the return of each said vanes is further reduced by means connected to the third compartment within said third compartment.

10. The steering damper of claim 9 wherein means for further reducing the opposing pressure is at-least-one recess forming a reservoir for the fluid in the third compartment for absorbing the fluid being advanced by the vane returning to center without increasing the pressure of said fluid.

11. The vehicle of claim 1 wherein the vanes are mounted rotatable coaxial with the axis of the handlebars.

12. The vehicle of claim 1 wherein the permitting means is connected to the vanes.

13. A steering damper for a vehicle having a frame, steerable wheel means movably mounted on said frame, handlebars mounted on said frame rotatable about an axis relative to said frame, connected to said steerable wheel means for controlling the steering movement thereof; said steering damper including: a cylinder assembly including a hollow cylinder having closures at the ends thereof and being adapted to have a damping fluid therein, a dam fixedly mounted in said cylindrical assembly extending along the surface of the cylinder between the closures, a vane assembly including vanes extending from a shaft, said vane assembly being mounted in said cylindrical assembly with said shaft extending axially and said vanes radially, said vanes being dimensioned to extend axially to said closures on each side and radially to the periphery of said cylinder, there being spacing between said vanes and closures and said vanes and said periphery such as to permit ready movement of said vanes, said shaft being adapted to be connected to said handlebars to rotate said vanes circumferentially in said cylinder assembly in synchronism with the rotation of the handlebars following the movement of said handlebars responsive to the steering movement of said steerable wheel means in either direction, said vane assembly when being rotated in one of said either directions defining between a first vane approaching the dam and the dam a first substantially closed compartment of decreasing volume and between a second vane retreating from the dam and the dam a second substantially closed compartment of increasing volume, the movement of said first vane increasing the pressure within said first compartment, means, responsive to said increasing pressure, for transmitting fluid under said pressure from said first compartment to said second compartment, the transmitting means being dimensioned and the viscosity of the fluid being such that the movement of the vanes in the fluid exerts a damping force on the handlebars as said vanes are moved in said one direction, and means, responsive to the return of said vanes in the direction opposite to said one direction, for permitting said handlebars to return from said one direction in the opposite direction with substantially no damping.

14. The steering damper of claim 13 including a third compartment defined between the vanes, a part of at-least-one of the closures extending over said third compartment with the vanes at center, having a recess therein, said vanes being spaced from the at-least-one closure over said recess whereby the pressure produced by a vane retreating from pressure increasing position is substantially reduced.

15. The steering damper of claim 13 wherein the vane assembly is mounted coaxially with the axis about which the handlebars are rotatable.

16. A steering damper for a vehicle having a frame, steerable wheel means mounted on said frame movable in either direction from the center, handlebars on said frame rotatable in either direction about an axis relative to said frame connected to said steerable wheel means for controlling the steering movement of said steerable wheel means, said handlebars being connected to said steerable wheel means so that said handlebars are in center with said steerable wheel means in center and the movement of said handlebars in either direction and in magnitude corresponding to the movement of said steerable wheel/means in direction and magnitude, said handlebars being manually rotatable from said center in either direction and also being rotatable from said center undesirably on contact of said steerable wheel means with an obstruction; said steering damper including: a container adapted to have damping fluid therein, means in said container including vanes movable in said fluid from center, means in said container to define with a first of said vanes a first compartment of variable volume dependent on the position of said first vane and also to define with a second of said vanes a second compartment of variable volume dependent on the position of said second vane, a third compartment being defined between the first and second vanes, means connecting said handlebars to said vanes, to rotate said vanes in synchronism with the rotation of said handlebars about said axis, the connection being such that the center of said vanes corresponds to the center of said handlebars and the movement of said handlebars in one direction from center reduces the volume of said first compartment and increases the pressure of said fluid against the movement of said first vane thereby damping the movement of said handlebars in said first direction and also increasing the volume of said second compartment, and the movement of the handlebars in the opposite direction from center reduces the volume of said second compartment and increases the pressure of said fluid against said second vane, and also increases the volume of said first compartment and means, responsive to the return of said vanes following movement of said vanes in said one direction or said opposite direction, for reducing substantially the pressure in said fluid in said first compartment or said second compartment respectively opposing the return of each of said first and second vanes respectively, to their center, as the case may be, to reduce substantially the damping against the return of each of said vanes to the center thereby to facilitate the return of said handlebars and the steering wheel means to their center positions.

17. The steering damper of claim 16 wherein the pressure reducing means includes a one-way valve in each of the vanes actuable by the pressure of the fluid to close when a said each vane is moving under pressure to reduce the volume of its corresponding compartment and by the relaxed pressure to open when said last-named vane is moving to increase the volume of its corresponding compartment.

18. The steering damper of claim 16 wherein the container includes a hollow member having closures spaced a short distance from the ends of the vanes just sufficient to permit sweeping movement to the vanes over said closures; the steering damper being characterized by that there is at-least-one recess in that part of at-least-one of said closures in the bounding the third compartment with the vanes at center, the ends of the vanes as they sweep over said at-least-one recess being spaced from said at-least-one closure over the recess, whereby the pressure opposing the return of the vanes to center is substantially reduced.

19. The steering damper of claim 16 wherein the vanes are rotatable about an axis coaxial with the axis of the handlebars.

20. A vehicle having a frame, a hollow head supported by said frame, steerable wheel means movably mounted on said frame, a gooseneck mounted in said head rotatable in either direction from a center about the axial centerline of said head, handlebars connected to said gooseneck rotatable therewith from a center, said handlebars being also connected to said steerable wheel means for controlling the steering movement thereof, a cylindrical assembly mounted fixedly within said head, said assembly including a cylindrical wall having closures at the ends thereof, said assembly being adapted to contain a damping fluid a dam mounted fixedly within said cylindrical assembly, first and second vanes mounted within said assembly connected to said gooseneck rotatable therewith in either direction from a center to a first position where said first vane approaches said dam on one side or to a second position where said second vane approaches said dam on the opposite side, said vanes being in their said center with said steerable wheel means and said handlebars being in their center and the displacement of said vanes from their said center corresponding to the displacement of said handlebars from their center responsive to the displacement of said steerable wheel means from its said center, said vanes when displaced from their respective center on the displacement of said handlebars from their center, in cooperation with said fluid, damping the movement of said handlebars while being displaced from their center.

21. The vehicle of claim 20 wherein on the displacement of the vanes in either direction from center, the vanes are returnable to center, characterized by means responsive to the return of the vanes to center for suppressing the damping against the return of said vanes to center.

22. The vehicle of claim 21 wherein each vane includes a one-way valve operative to suppress the damping on the return of a vane to center.

23. The vehicle of claim 22 wherein at-least-one of the closures includes at-least-one recess over part of its surface and the vanes are so near to the closures that each defines a substantially closed compartment with the dam on its side except as it sweeps over said at-least-one recess, whereby the damping is additionally suppressed as said vane sweeps over said recess.

24. A vehicle including a frame, steerable wheel means movably mounted on said frame, handlebars mounted on said frame rotatable about an axis relative to said frame connected to said steerable wheel means for controlling the steering movement thereof, and a steering damper connected to said handlebars for damping the movement of said handlebars on the contact of said wheel means with an obstruction undesirably turning said wheel means and the handlebars connected thereto; said damper including: a hollow cylinder having closures at the ends thereof, said cylinder and closures forming a cylindrical assembly, means connecting said assembly fixedly to said frame, said assembly being adapted to have therein a damping fluid, dam means fixedly connected to said assembly extending into said cylinder along the length of said cylinder, vane means dimensioned to extend axially between said closures and radially to the inner periphery of said cylinder but readily movable along said closures and periphery, means penetrating through said closure at least at one end of said assembly, connecting said handlebars to said vane means so that said vane means is rotatable in said fluid in synchronism with the rotation of said handlebars about said axis, said rotation of said vane means defining closed compartments of variable volume between said dam means and said vane means with a first compartment decreasing in volume defined by a first part of said vane means approaching said dam means with said handlebars moved in one direction and a second compartment increasing in volume defined by said dam means and a second part of said vane means retreating from said dam means, said first part of said vane means producing pressure towards the dam means on the fluid in said first compartment, means, responsive to said exerted pressure, for transmitting the fluid under pressure from said first compartment to said second compartment, said transmitting means being adapted to enable said fluid as it is transmitted to damp the movement of said handlebars in said one direction, and means, responsive to the return of said handlebars in the direction opposite to said one direction, for permitting the return of said handlebars in the direction opposite to said one direction with substantially no damping.

* * * * *